US009682337B2

(12) United States Patent
Okazaki et al.

(10) Patent No.: US 9,682,337 B2
(45) Date of Patent: Jun. 20, 2017

(54) CERAMIC HONEYCOMB FILTER AND ITS PRODUCTION METHOD

(71) Applicant: HITACHI METALS, LTD., Tokyo (JP)

(72) Inventors: Shunji Okazaki, Fukuoka (JP); Toshitaka Ishizawa, Fukuoka (JP)

(73) Assignee: HITACHI METALS, LTD., Tokyo (JP)

( * ) Notice: Subject to any disclaimer, the term of this patent is extended or adjusted under 35 U.S.C. 154(b) by 403 days.

(21) Appl. No.: 14/339,596

(22) Filed: Jul. 24, 2014

(65) Prior Publication Data

US 2014/0333000 A1 Nov. 13, 2014

Related U.S. Application Data

(62) Division of application No. 13/638,283, filed as application No. PCT/JP2011/058132 on Mar. 30, 2011, now Pat. No. 8,821,609.

(30) Foreign Application Priority Data

Apr. 1, 2010 (JP) ................................. 2010-085179

(51) Int. Cl.
*B01D 39/14* (2006.01)
*B01D 39/06* (2006.01)
(Continued)

(52) U.S. Cl.
CPC ..... *B01D 46/0001* (2013.01); *B01D 46/2418* (2013.01); *B01D 46/2429* (2013.01);
(Continued)

(58) Field of Classification Search
CPC . F01N 3/022; F01N 2330/60; C04B 38/0009; C04B 38/0067; C04B 38/0054;
(Continued)

(56) References Cited

U.S. PATENT DOCUMENTS 5,258,150 A 11/1993 Merkel et al.
6,261,982 B1 7/2001 Takahashi et al.
(Continued)

FOREIGN PATENT DOCUMENTS

CN 101395102 A 3/2009
EP 0 545 008 A1 6/1993
(Continued)

OTHER PUBLICATIONS

International Search Report of PCT/JP2011/058132 dated Jun. 28, 2011.
(Continued)

*Primary Examiner* — Amber R Orlando
(74) *Attorney, Agent, or Firm* — Sughrue Mion, PLLC

(57) ABSTRACT

A ceramic honeycomb filter including a ceramic honeycomb structure having large numbers of flow paths partitioned by porous cell walls, and plugs disposed in the flow paths alternately on the exhaust gas inlet or outlet side, to remove particulate matter from an exhaust gas passing through the porous cell walls; the porous cell walls having porosity of 45-75%, the median pore diameter A ($\mu$m) of the cell walls measured by mercury porosimetry, and the median pore diameter B ($\mu$m) of the cell walls measured by a bubble point method meeting the formula of $35 < (A-B)/B \times 100 \leq 70$, and the maximum pore diameter of the cell walls measured by a bubble point method being 100 $\mu$m or less.

12 Claims, 1 Drawing Sheet

(51) Int. Cl.
*B01D 39/20* (2006.01)
*B01D 50/00* (2006.01)
*B01D 46/00* (2006.01)
*B01D 46/24* (2006.01)
*C04B 35/195* (2006.01)
*C04B 38/00* (2006.01)
*F01N 3/022* (2006.01)
*C04B 38/06* (2006.01)
*C04B 111/00* (2006.01)
*B01J 35/04* (2006.01)

(52) U.S. Cl.
CPC ........ *C04B 35/195* (2013.01); *C04B 38/0009* (2013.01); *C04B 38/0054* (2013.01); *C04B 38/0067* (2013.01); *C04B 38/06* (2013.01); *F01N 3/0222* (2013.01); *B01D 2046/2433* (2013.01); *B01D 2046/2496* (2013.01); *B01D 2279/30* (2013.01); *B01J 35/04* (2013.01); *C04B 2111/00793* (2013.01); *C04B 2235/3201* (2013.01); *C04B 2235/3206* (2013.01); *C04B 2235/3208* (2013.01); *C04B 2235/5436* (2013.01); *C04B 2235/6021* (2013.01); *C04B 2235/9607* (2013.01); *F01N 2330/60* (2013.01); *Y02T 10/20* (2013.01)

(58) Field of Classification Search
CPC ................ C04B 38/06; C04B 35/195; C04B 2111/00793; C04B 2235/3201; C04B 2235/3206; B01D 46/001; B01D 46/2418; B01D 46/2429; B01D 2046/2433; B01D 2046/2496; B01D 2279/30; B01J 35/04; Y02T 10/20
See application file for complete search history.

(56) References Cited

U.S. PATENT DOCUMENTS

| | | | |
|---|---|---|---|
| 6,566,290 B2 | 5/2003 | Beall et al. | |
| 6,576,579 B2 | 6/2003 | Merkel | |
| 6,773,481 B2 | 8/2004 | Noguchi et al. | |
| RE38,888 E | 11/2005 | Beall et al. | |
| 7,141,089 B2 | 11/2006 | Beall et al. | |
| 7,179,316 B2 | 2/2007 | Merkel et al. | |
| 7,648,548 B2 | 1/2010 | Miao et al. | |
| 7,744,670 B2 | 6/2010 | Miao et al. | |
| 7,867,598 B2 | 1/2011 | Miyairi et al. | |
| 8,133,841 B2 | 3/2012 | Noda et al. | |
| 8,309,012 B2 | 11/2012 | Okazaki | |
| 2002/0004445 A1 | 1/2002 | Beall et al. | |
| 2003/0024220 A1 | 2/2003 | Ishihara et al. | |
| 2004/0261384 A1 | 12/2004 | Merkel et al. | |
| 2006/0107641 A1 | 5/2006 | Kasai et al. | |
| 2006/0215814 A1* | 9/2006 | Kotani | C01B 33/26 378/75 |
| 2007/0033912 A1 | 2/2007 | Furukawa et al. | |
| 2007/0107397 A1 | 5/2007 | Merkel et al. | |
| 2007/0107398 A1 | 5/2007 | Merkel et al. | |
| 2007/0119135 A1 | 5/2007 | Miao et al. | |
| 2008/0050557 A1 | 2/2008 | Beall et al. | |
| 2008/0155952 A1* | 7/2008 | Okazaki | B01D 46/2429 55/523 |
| 2009/0008811 A1 | 1/2009 | Okazaki | |
| 2010/0205921 A1 | 8/2010 | Okazaki et al. | |
| 2011/0121478 A1 | 5/2011 | Beall et al. | |
| 2011/0135873 A1* | 6/2011 | Okazaki | C04B 35/195 428/116 |
| 2012/0148792 A1 | 6/2012 | Okazaki | |

FOREIGN PATENT DOCUMENTS

| | | | |
|---|---|---|---|
| EP | 2455153 A1 | 5/2012 | |
| JP | 2001-260117 A | 9/2001 | |
| JP | 2003-120256 A | 4/2003 | |
| JP | 2003-534229 A | 11/2003 | |
| JP | 2006-095352 A | 4/2006 | |
| JP | 2006-265034 A | 10/2006 | |
| JP | 2007-525612 A | 9/2007 | |
| JP | 2010-501467 A | 1/2010 | |
| JP | WO2010013509 | * | 2/2010 |

OTHER PUBLICATIONS

Extended European Search Report dated Jul. 23, 2013 in corresponding European Patent Application No. Ep 11765697.5.
European Office Action for Application No. 11765697.5 dated Mar. 28, 2014, 5 pages.

* cited by examiner

CERAMIC HONEYCOMB FILTER AND ITS PRODUCTION METHOD

CROSS REFERENCE TO RELATED APPLICATIONS

This application is a divisional of application Ser. No. 13/638,283 filed Sep. 28, 2012, which is a National Stage of International Application No. PCT/JP2011/058132 filed Mar. 30, 2011 (claiming priority based on Japanese Patent Application No. 2010-085179 filed Apr. 1, 2010), the contents of which are incorporated herein by reference in their entirety.

FIELD OF THE INVENTION

The present invention relates to a ceramic honeycomb filter for removing particulate matter from exhaust gases discharged from diesel engines, and its production method.

BACKGROUND OF THE INVENTION

An exhaust gas discharged from diesel engines contains particulate matter (PM) comprising as main components carbonaceous soot and soluble organic fractions (SOFs) comprising high-boiling-point hydrocarbon components, which are likely to adversely affect humans and environment when discharged into the air. Accordingly, ceramic honeycomb filters have conventionally been attached to exhaust pipes of diesel engines for removing PM. One example of ceramic honeycomb filters for capturing PM in the exhaust gas is shown in FIGS. 1 and 2. A ceramic honeycomb filter 10 comprises a ceramic honeycomb structure comprising porous cell walls 2 defining a large number of outlet-side-sealed flow paths 3 and inlet-side-sealed flow paths 4 and a peripheral wall 1, and upstream-side plugs 6a and downstream-side plugs 6c sealing the exhaust-gas-inlet-side end surface 8 and exhaust-gas-outlet-side end surface 9 of the outlet-side-sealed flow paths 3 and the inlet-side-sealed flow paths 4 alternately in a checkerboard pattern.

As shown in FIG. 2, this ceramic honeycomb filter 10 is gripped by support members 14 and longitudinally sandwiched by support members 13a, 13b in a metal container 12. The support members 14 are generally formed by metal meshes and/or ceramic mats. The ceramic honeycomb filter 10 mounted to a diesel engine receives mechanical vibration and shock from the engine, road surfaces, etc. via the support members 13a, 13b and 14. Because such large ceramic honeycomb filters as having outer diameters of more than 200 mm are subject to a large load by vibration and shock, they are required to have high strength.

Among the characteristics required for ceramic honeycomb filters, PM-capturing efficiency, pressure loss, and a PM-capturable time period (a time period until pressure loss reaches a predetermined level from the start of capturing) are important. Particularly the capturing efficiency and the pressure loss are in a contradictory relation, higher capturing efficiency leading to larger pressure loss and thus a shorter PM-capturable time period. A low-pressure-loss design provides low capturing efficiency, despite a long PM-capturable time period. To satisfy all of these contradictory filter characteristics, investigation has conventionally been conducted to provide technologies of controlling the porosity, pore size distribution, etc. of the ceramic honeycomb structure.

JP 2003-534229 A discloses a ceramic structure having a cordierite phase as a main component, and a thermal expansion coefficient of more than $4 \times 10^{-7}/°$C. and less than $13 \times 10^{-7}/°$C. between 25° C. and 800° C., its permeability and pore size distribution meeting the formula of 2.108×(permeability)+18.511×(total pore volume)+0.1863×(percentage of pores of 4-40 μm to total pore volume)>24.6.

JP 2007-525612 A discloses a filter for capturing diesel particulate matter, which has a median diameter d50 of less than 25 μm, and a pore size distribution and porosity meeting the relation of Pm≤3.75, wherein Pm is expressed by Pm=10.2474 [1/((d50)$^2$ (% porosity/100))]+0.0366183 (d90)−0.00040119 (d90)$^2$+0.468815 (100/% porosity)$^2$+0.0297715 (d50)+1.61639 (d50−d10)/d50, wherein d10, d50 and d90 (d10<d50<d90) represents pore diameters at cumulative pore sizes (by volume) of 10%, 50% and 90%, respectively.

The technologies described in JP 2003-534229 A and JP 2007-525612 A restrict only pore structures (size and distribution) measured by mercury porosimetry to predetermined ranges, but they fail to design ceramic honeycomb filters capable of efficiently capturing nano-sized PM, which are considered to have particularly large influence on humans, with small pressure loss.

JP 2006-095352 A discloses a honeycomb filter having porosity of 45-70%, which has cell walls formed by a porous substrate having an average pore diameter A (μm) measured by mercury porosimetry, and an average pore diameter B (μm) measured by a bubble point method, an average pore diameter difference ratio [(A−B)/B]×100 being 35% or less, the average pore diameter B being 15-30 μm, and the maximum pore diameter measured by a bubble point method being 150 μm or less.

JP 2006-095352 A describes that the average pore diameter A measured by mercury porosimetry is a value reflecting the average diameter of pores on cell wall surfaces, while the average pore diameter B measured by a bubble point method is a value reflecting the minimum pore diameter in the cell walls, that therefore, in the case of cell walls having a pore structure as shown in FIG. 4 (*a*), in which pores in the cell walls have small diameters, while those on cell wall surfaces have large diameters, the average pore diameter B measured by the bubble point method is much smaller than the average pore diameter A measured by mercury porosimetry, and that on the other hand, in the case of cell walls having a pore structure as shown in FIG. 4 (*b*), in which pores in and on the cell walls have the same diameters, and in the case of cell walls having a pore structure as shown in FIG. 4 (*c*), in which pores in the cell walls are larger than those on cell wall surfaces, the average pore diameters A and B measured by mercury porosimetry and the bubble point method are not substantially different.

JP 2006-095352 A describes that cell walls having the average pore diameter difference ratio of 35% or less, namely small difference between the average pore diameter A measured by mercury porosimetry and the average pore diameter B measured by the bubble point method, have a structure which comprises a smaller number of large pores on cell wall surfaces than that of small pores in the cell walls [FIG. 4 (*a*)], a ratio of diameters in the cell walls to those on cell wall surfaces being relatively small; namely, there are many pores having similar diameters in and on the cell walls [FIG. 4 (*b*)], and many smaller pores on cell wall surfaces than those in the cell walls [FIG. 4 (*c*)]. Namely, the honeycomb filter described in JP 2006-095352 A is constituted by cell walls having many pores as shown in FIGS. 4 (*b*) and 4 (*c*).

Because honeycomb filters shown in Examples of JP 2006-095352 A have the maximum pore diameter measured by the bubble point method in a range of 129-145 μm, it is expected that pores in the cell walls have larger diameters. Accordingly, the honeycomb filters have insufficient efficiency of capturing nano-sized PM having particularly large influence on humans, despite small pressure loss.

OBJECT OF THE INVENTION

Accordingly, an object of the present invention is to provide a ceramic honeycomb filter having low pressure loss as well as improved efficiency of capturing PM, particularly nano-sized PM, and its production method.

SUMMARY OF THE INVENTION

Thus, the ceramic honeycomb filter of the present invention comprises a ceramic honeycomb structure having large numbers of flow paths partitioned by porous cell walls, and plugs disposed in the flow paths alternately on the exhaust gas inlet or outlet side, to remove particulate matter from exhaust gas passing through the porous cell walls, the porous cell walls having porosity of 45-75%, the median pore diameter A (μm) of the cell walls measured by mercury porosimetry, and the median pore diameter B (μm) of the cell walls measured by a bubble point method meeting the formula of $35<(A-B)/B \times 100 \leq 70$, and the maximum pore diameter of the cell walls measured by a bubble point method being 100 μm or less.

The ceramic honeycomb filter of the present invention preferably has a bulk density of 0.5 g/cm$^3$ or less.

The ceramic honeycomb filter of the present invention preferably has a thermal expansion coefficient of $13 \times 10^{-7}/°$C. or less between 20° C. and 800° C.

The porous cell walls preferably have permeability of $2 \times 10^{-12}$ m$^2$ to $10 \times 10^{-12}$ m$^2$.

It is preferable that the porous cell walls have porosity of 55-70%, that the median pore diameter A of the cell walls measured by mercury porosimetry is 25-35 μm, and that the volume of pores having diameters of 15-40 μm is 60-90% of the total pore volume.

The volume of pores having diameters of more than 50 μm is preferably more than 10% and 23% or less of the total pore volume when the porous cell walls are measured by mercury porosimetry.

A main component of a crystal phase constituting the ceramic honeycomb structure is preferably cordierite.

The bulk filter density is preferably 0.4 g/cm$^3$ or less, more preferably 0.3 g/cm$^3$ or less.

The thermal expansion coefficient of the ceramic honeycomb structure between 20° C. and 800° C. is preferably $10 \times 10^{-7}/°$C. or less, more preferably $8 \times 10^{-7}/°$C. or less.

A honeycomb rod cut out of the ceramic honeycomb structure in parallel to the direction of the flow paths preferably has a bending strength of 1 MPa or more when measured by a 4-point measurement method.

A honeycomb rod cut out of the ceramic honeycomb structure in parallel to the direction of the flow paths preferably has a Young's modulus of 0.5 GPa or more.

The method of the present invention for producing a ceramic honeycomb filter comprises the steps of blending a starting material powder comprising a cordierite-forming material comprising talc, silica, an alumina source and kaolin, and a pore-forming material to prepare a moldable material, extruding the moldable material to form a honeycomb-shaped molding, and plugging the predetermined flow paths of the honeycomb-shaped molding to form the ceramic honeycomb filter, the silica having a median diameter of 15-60 μm, the talc having a median diameter of 10-25 μm and a morphology index of 0.77 or more, the kaolin particles having a median diameter of 1-8 μm and a cleavage index of 0.9 or more, the cleavage index being a value expressed by $I_{(002)}/[I_{(200)}+I_{(020)}+I_{(002)}]$, wherein $I_{(200)}$, $I_{(020)}$ and $I_{(002)}$ are the peak intensities of (200), (020) and (002) planes measured by X-ray diffraction, the alumina source having a median diameter of 1-6 μm, the pore-forming material having a median diameter of 30-70 μm, and the cordierite-forming material being classified by passing through a sieve having opening diameters of 250 μm or less.

In a curve showing the relation between a particle diameter and a cumulative volume in the pore-forming material, a particle diameter d90 at a cumulative volume corresponding to 90% of the total volume is preferably 50-90 μm.

The alumina source preferably has a median diameter of 2-5 μm.

The silica preferably has a median diameter of 35-55 μm.

DESCRIPTION OF THE PREFERRED EMBODIMENTS

[1] Structure of Ceramic Honeycomb Filter

Figure 1:
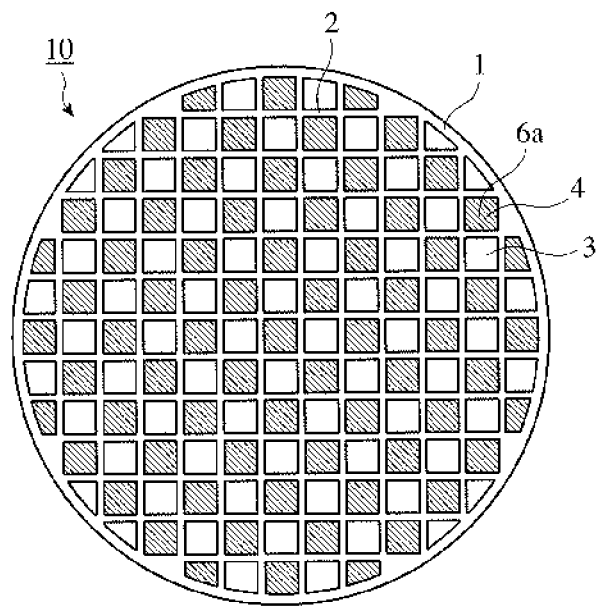
FIG. 1 is a front view schematically showing one example of ceramic honeycomb filters.
Figure 2:
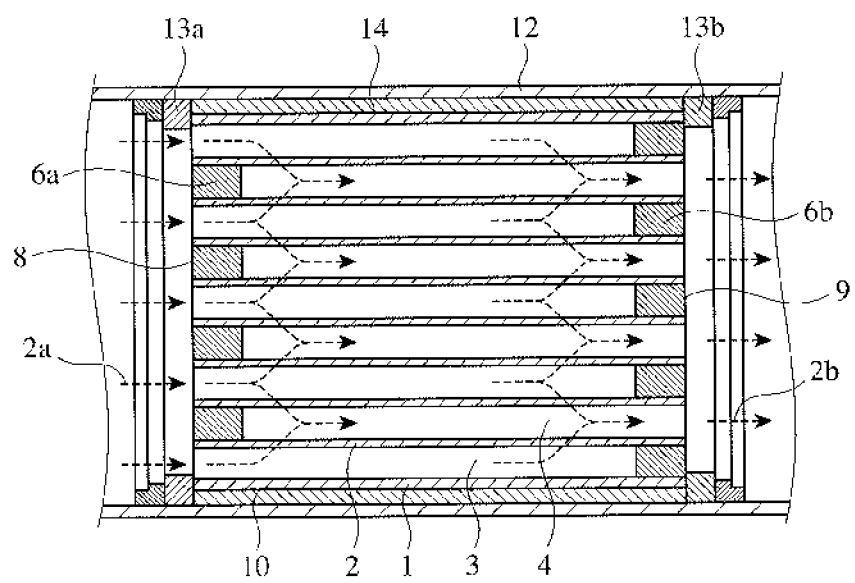
FIG. 2 is a schematic cross-sectional view showing one example of ceramic honeycomb filters disposed in a metal container.

The ceramic honeycomb filter of the present invention comprises a ceramic honeycomb structure having large numbers of flow paths partitioned by porous cell walls, and plugs disposed in the flow paths alternately on the exhaust gas inlet or outlet side, to remove particulate matter from an exhaust gas passing through the porous cell walls; the porous cell walls having porosity of 45-75%, the median pore diameter A (μm) of the cell walls measured by mercury porosimetry, and the median pore diameter B (μm) of the cell walls measured by a bubble point method meeting the formula of $35<(A-B)/B \times 100 \leq 70$, and the maximum pore diameter of the cell walls measured by a bubble point method being 100 μm or less. This ceramic honeycomb filter has improved efficiency of capturing PM, particularly nano-sized PM, while keeping low pressure loss.

When the porous cell walls have porosity of less than 45%, it is impossible to keep low pressure loss. On the other hand, when the porosity exceeds 75%, the porous cell walls do not have enough strength to endure use. The porosity is preferably 50-73%, more preferably 55-70%.

The formula of $35<(A-B)/B \times 100 \leq 70$ means that the median pore diameter A is larger than the median pore diameter B, and that a ratio of the median pore diameter A to the median pore diameter B is in a range of $1.35<A/B \leq 1.7$. The median pore diameter A measured by mercury porosimetry is a value reflecting the average diameter of pores on cell wall surfaces, while the median pore diameter B measured by a bubble point method is a value reflecting the minimum diameters of pores in the cell walls. Accordingly, meeting the above formula means that the diameters of pores on cell wall surfaces are larger than those of pores in the cell walls in the ceramic honeycomb filter, and that their ratio is relatively large, namely the diameters of pores decrease from the surface to the inside with a large changing ratio. Therefore, the ceramic honeycomb filter has good nano-sized PM-capturing efficiency while keeping low pressure loss. Further, the maximum pore diameter of 100 μm or less measured by a bubble point method improves the efficiency of capturing nano-sized PM, which is considered to have large influence on humans. To achieve higher PM-capturing efficiency with lower pressure loss, the maximum pore diameter measured by a bubble point method is preferably 30 μm or more.

The value of [(A−B)/B×100] of 35% or less, namely small difference between the diameters of pores on cell wall surfaces and those of pores in the cell walls, provides a low efficiency of capturing nano-sized PM. When the above value exceeds 70%, it is difficult to keep low pressure loss. The value of [(A−B)/B×100] is preferably 40-65%. When the maximum pore diameter measured by a bubble point method exceeds 100 μm, pores in the cell walls have large diameters, resulting in insufficient efficiency of capturing PM, particularly nano-sized PM, which is considered to have large influence on humans. Also, the diameters of pores on cell wall surfaces become relatively large, resulting in low strength.

The mercury porosimetry is a method of pressurizing a cell wall sample immersed in mercury in vacuum, and obtaining the relation between pressure when pressurizing and the volume of mercury forced into pores in the sample to determine the pore diameter distribution of the sample. In the mercury porosimetry, as pressure gradually increases, mercury first enter larger surface pores and then smaller pores, finally filling all pores. The total pore volume (total volume of entire pores) is determined from the amount of mercury forced into all pores, and a pore diameter at which the cumulative volume of mercury forced into pores corresponds to 50% of the total pore volume is regarded as a median pore diameter measured by mercury porosimetry.

The bubble point method is a method for determining pore diameters of a cell wall sample by immersing the cell wall sample in a liquid having a known surface tension to make the sample fully wet with the liquid, applying a gas pressure to one surface of the sample so that the gas flows through the cell wall sample, and determining the pore diameters by the amount of the flowing gas. As the gas pressure increases, the liquid contained in pores are forced out from another surface, so that the gas flows through the sample, and when the gas pressure gas further increases, the flow rate of the gas increases. A pore diameter distribution can be determined by measuring the pressure applied and the flow rate of the gas. A pore diameter at which the flow rate corresponds to 50% of a saturated flow rate is regarded as a median pore diameter measured by the bubble point method. A pore diameter corresponding to the smallest pressure permitting a gas flow is the maximum pore diameter in the sample.

The bulk density of the ceramic honeycomb filter is preferably 0.5 g/cm$^3$ or less. The bulk filter density is a quotient obtained by dividing the mass of the honeycomb filter by the total volume of the honeycomb filter. With the bulk filter density of 0.5 g/cm$^3$ or less, an exhaust gas flows through the honeycomb filter with small resistance, resulting in low pressure loss. On the other hand, when the bulk filter density exceeds 0.5 g/cm$^3$, low pressure loss is unlikely kept. The bulk filter density is preferably 0.4 g/cm$^3$ or less, more preferably 0.3 g/cm$^3$ or less. The bulk filter density is preferably 0.2 g/cm$^3$ or more to have enough strength.

The ceramic honeycomb filter preferably has a thermal expansion coefficient of 13×10$^{-7}$ or less between 20° C. and 800° C. With the thermal expansion coefficient of 13×10$^{-7}$ or less, the ceramic honeycomb filter can maintain heat shock resistance with practically durable strength when used as a filter for removing particulate matter from an exhaust gas of diesel engines. The thermal expansion coefficient between 20° C. and 800° C. is preferably 10×10$^{-7}$ or less, more preferably 3×10$^{-7}$ to 8×10$^{-7}$.

To keep low pressure loss, the permeability of the porous cell walls is preferably 2×10$^{-12}$ m$^2$ to 10×10$^{-12}$ m$^2$. The permeability of less than 2×10$^{-12}$ m$^2$ is likely to increase the pressure loss, and the permeability of more than 10×10$^{-12}$ m$^2$ is likely to deteriorate the PM-capturing performance. The permeability is more preferably more than 3×10$^{-12}$ m$^2$ and 8×10$^{-12}$ m$^2$ or less.

The median pore diameter A of the porous cell walls measured by mercury porosimetry is preferably 25-35 μm. The median pore diameter A of less than 25 μm is likely to lower the pressure loss characteristics, and the median pore diameter A exceeding 35 μm results in as low strength as practically unacceptable. The average pore diameter A is preferably 26-34 μm, more preferably 27-33 μm.

The volume of pores having diameters of 15-40 μm in the porous cell walls measured by mercury porosimetry is preferably 60-90% of the total pore volume. When the volume of pores having diameters of 15-40 μm is less than 60% of the total pore volume, there are many fine pores having diameters of less than 15 μm, which adversely affect the pressure loss characteristics, and many large pores having diameters of more than 40 μm, which are likely to lower the strength. On the other hand, when the volume of pores having diameters of 15-40 μm exceeds 90% of the total pore volume, fine pores having diameters of less than 15 μm and large pores having diameters of more than 40 μm are in small percentages, likely failing to secure the communications of pores to have low pressure loss. The total volume of pores having diameters of 15-40 μm is preferably 65-85%, more preferably 65-80%.

The volume of pores having diameters of more than 50 μm measured by mercury porosimetry is preferably more than 10% and 23% or less of the total pore volume. When the volume of pores having diameters of more than 50 μm is 10% or less, the pressure loss characteristics are likely deteriorated. When it is more than 25%, the percentage of large pores is likely large, resulting in low strength. The total volume of pores having diameters exceeding 50 μm is preferably 11-22%, more preferably 12-21%.

The ceramic honeycomb structure preferably comprises cordierite as a main component of its crystal phase, with 3-6% by mass of spinel and 1-8% by mass of cristobalite. With such crystal composition, size changes (expansion) by sintering can be suppressed, providing the sintered ceramic honeycomb structure with small size changes. The more preferred crystal composition contains 4-5% by mass of spinel, and 2-7% by mass of cristobalite. The crystal phase may contain mullite, corundum, tridymite, etc., in addition to cordierite, spinel and cristobalite.

A honeycomb rod cut out of the ceramic honeycomb structure in parallel to the direction of flow paths preferably has a bending strength of 1 MPa or more when measured by a 4-point measurement method. With such bending strength, ceramic honeycomb filters having enough strength to bear use can be obtained. The bending strength is preferably 2 MPa or more.

A honeycomb rod cut out of the ceramic honeycomb structure in parallel to the direction of flow paths preferably has a Young's modulus of 0.5 GPa or more. With such Young's modulus, ceramic honeycomb filters having enough strength to bear use can be obtained. With the Young's modulus of less than 0.5 GPa, the ceramic honeycomb filters are likely deformed and broken by vibration or shock during use. The Young's modulus is preferably 1 GPa or more.

[2] Production Method of Ceramic Honeycomb Filter

The production method of the ceramic honeycomb filter of the present invention comprises the steps of blending a starting material powder comprising a cordierite-forming material comprising talc, silica, an alumina source and kaolin, and a pore-forming material to prepare a moldable material, extruding the moldable material to form a honeycomb-shaped molding, and plugging the predetermined flow paths of the honeycomb-shaped molding to form the ceramic honeycomb filter; the silica having a median diameter of 15-60 μm, the talc having a median diameter of 10-25 μm and a morphology index of 0.77 or more, the kaolin particles having a median diameter of 1-8 μm and a cleavage index of 0.9 or more, the cleavage index being a value expressed by $I_{(002)}/[I_{(200)}+I_{(020)}+I_{(002)}]$, wherein $I_{(200)}$, $I_{(020)}$, and $I_{(002)}$ are the peak intensities of (200), (020) and (002) planes measured by X-ray diffraction, the alumina source having a median diameter of 1-6 μm, the pore-forming material having a median diameter of 30-70 μm, and the cordierite-forming material being classified by passing through a sieve having opening diameters of 250 μm or less, to limit the percentage of fine pores deteriorating pressure loss characteristics and large pores lowering strength, thereby increasing the percentage of pores necessary for keeping low pressure loss.

This production method provides the ceramic honeycomb filter of the present invention, which comprises porous cell walls (i) having porosity of 45-75%, the median pore diameter A (μm) measured by mercury porosimetry and the median pore diameter B (μm) measured by a bubble point method meeting the formula of $35<(A-B)/B\times100\leq70$, and the maximum pore diameter measured by a bubble point method being 100 μm or less, and has (ii) a bulk density of 0.5 g/cm$^3$ or less, (iii) a thermal expansion coefficient of $13\times10^7/°$ C. or less between 20° C. and 800° C., and (iv) permeability of $2\times10^{-12}$ m$^2$ to $10\times10^{-12}$ m$^2$.

The ceramic material is preferably a cordierite-forming material. The cordierite-forming material is obtained by mixing silica source powder, alumina source powder and magnesia source powder, such that the resultant main crystal is cordierite having a chemical composition comprising as main components 42-56% by mass of SiO$_2$, 30-45% by mass of Al$_2$O$_3$ and 12-16% by mass of MgO. Pores formed in the ceramic comprising cordierite as a main crystal are mainly constituted by pores formed by sintering silica, and pores formed by burning off the pore-forming material.

(a) Silica Particles

It is known that silica is more stable than other materials up to high temperatures, and melt-diffused at 1300° C. or higher to form pores. The presence of 10-25% by mass of silica in the cordierite-forming material provides a desired amount of pores. With more than 25% by mass of silica contained, the amounts of kaolin and/or talc, other silica sources, should be reduced to keep cordierite as a main crystal, decreasing the effect of kaolin of reducing thermal expansion (such effect is obtained by the orientation of kaolin during extrusion-molding), and thus resulting in low heat shock resistance. On the other hand, when silica is less than 10% by mass, the number of pores open on cell wall surfaces is small, likely failing to keep low pressure loss when PM is captured and accumulated. The amount of silica is preferably 12-22% by mass.

The silica particles used have a median diameter of 15-60 μm. When the median diameter of silica particles is less than 1.5 μm, many fine pores deteriorating the pressure loss characteristics are formed, and when it is more than 60 μm, many large pores lowering the strength are formed. The median diameter of silica particles is preferably 35-55 μm.

Though the silica particles may be crystalline or amorphous, they are preferably amorphous to control the particle size distribution. Amorphous silica can be obtained by melting high-purity, natural silica stone at high temperatures and pulverizing the resultant ingot. Though silica particles may contain Na$_2$O, K$_2$O and CaO as impurities, the total amount of the above impurities is preferably 0.1% or less to avoid a large thermal expansion coefficient.

The silica particles preferably have sphericity of 0.5 or more. When the sphericity of silica particles is less than 0.5, many fine pores deteriorating the pressure loss characteristics and many large pores lowering the strength are formed. The sphericity of silica particles is preferably 0.6 or more, more preferably 0.7 or more. The sphericity of a silica particle is a value obtained by dividing a projected area of the silica particle by the area of a circle, whose diameter is the longest straight line passing a center of gravity of the silica particle and connecting two points on a periphery of the particle, which is determined from an electron photomicrograph by an image analyzer.

High-sphericity silica particles can be obtained by spraying finely pulverized, high-purity, natural silica stone into a high-temperature flame. Spraying into a high-temperature flame causes the melting and spheroidization of silica particles simultaneously, providing high-sphericity, amorphous silica. The spherical silica particles are preferably adjusted with respect to particle size by classification, etc.

(b) Talc

The talc has a median diameter of 10-25 μm. As a magnesia component, 35-45% by mass of talc is preferably added. The talc may contain Fe$_2$O$_3$, CaO, Na$_2$O, K$_2$O, etc. as impurities. the amount of Fe$_2$O$_3$ in the talc is preferably 0.5-2.5% by mass to obtain the desired particle size distribution, and the total amount of Na$_2$O, K$_2$O and CaO is preferably 0.5% or less by mass to lower the thermal expansion coefficient.

To reduce the thermal expansion coefficient of the ceramic honeycomb structure whose main crystal phase is cordierite, talc particles are preferably in a plate-like shape. The morphology index, which is a measure of the platyness of talc particles, is preferably 0.77 or more, more preferably 0.8 or more, most preferably 0.83 or more. The above morphology index is, as described in U.S. Pat. No. 5,141,686, determined by the following formula:

$$\text{Morphology index}=Ix/(Ix+2Iy),$$

wherein Ix and Iy respectively represent the diffraction intensities of (004) and (020) planes of talc, which are obtained by the X-ray diffraction measurement of planar talc particles. The larger the morphology index, the more platy the talc particles.

The amount of talc added to the cordierite-forming material is preferably 40-43% by mass to form cordierite as a main crystal.

(c) Kaolin

Kaolin particles used have a median diameter of 1-8 μm. The ceramic cell walls whose main crystal is cordierite have pores formed by firing mainly silica particles and pores formed by burning off the pore-forming material in the sintering process. Because kaolin particles having a median diameter of 1-8 μm smaller than those of silica and the pore-forming material form pores between pores formed by the silica particles and the pore-forming material, making these pores communicable each other, a pore structure in which pores in the cell walls have small diameters with improved communicability, and pores on cell wall surfaces have larger diameters than those of pores in the cell walls. As a result, in the pore structure, the median pore diameter A (μm) of cell walls measured by mercury porosimetry, and the median pore diameter B (μm) of cell walls measured by a bubble point method meet the condition of $35 < (A-B)/B \times 100 \leq 70$, and the maximum pore diameter of the cell walls measured by a bubble point method is 100 μm or less. The median diameter of kaolin particles is preferably 2-6 μm.

When kaolin particles are oriented such that their c-axes are perpendicular to the longitudinal direction of the extrusion-molded honeycomb structure, the c-axes of cordierite crystals are in parallel to the longitudinal direction of the honeycomb structure, providing the honeycomb structure with a small thermal expansion coefficient. The shape of kaolin particles has large influence on the orientation of kaolin particles. The cleavage index of kaolin particles, which is an index indicating the shape of kaolin particles quantitatively, is preferably 0.9 or more, more preferably 0.93 or more. The cleavage index of kaolin particles can be determined by measuring the X-ray diffraction of press-molded kaolin particles to obtain the X-ray diffraction peak intensities $I_{(200)}$, $I_{(020)}$ and $I_{(002)}$ of (200), (020) and (002) planes of kaolin particles, and using the following formula:

Cleavage index=$I_{(002)}/[I_{(200)}+I_{(020)}+I_{(002)}]$.

The larger the cleavage index, the more the kaolin particles are oriented.

The cordierite-forming material preferably contains 1-15% by mass of kaolin particles. More than 15% by mass of kaolin particles likely increase fine pores having diameters of less than 5 μm in the ceramic honeycomb structure, thereby deteriorating the pressure loss characteristics, and less than 1% by mass of kaolin particles provide the ceramic honeycomb structure with a large thermal expansion coefficient. The amount of the kaolin powder is more preferably 4-8% by mass.

(d) Alumina

The alumina source used has a median diameter of 1-6 μm. The alumina source reduces the thermal expansion coefficient, and with a smaller median diameter than those of silica particles and the pore-forming material like the kaolin particles, it acts to make pores formed by sintering silica particles and pores formed by burning off the pore-forming material communicable each other. The alumina source preferably has a median diameter of 2-5 μm.

The alumina source is preferably aluminum oxide and/or aluminum hydroxide because of little impurities. When aluminum hydroxide is used, its amount in the cordierite-forming material is preferably 6-42% by mass, more preferably 6-15% by mass, most preferably 8-12% by mass. When aluminum oxide is used, its amount in the cordierite-forming material is preferably 30% or less by mass, more preferably 12-25% by mass, most preferably 20-24% by mass. The total amount of $Na_2O$, $K_2O$ and $CaO$, impurities in aluminum oxide and aluminum hydroxide, is preferably 0.5% or less by mass, more preferably 0.3% or less by mass, most preferably 0.1% or less by mass.

(e) Pore-Forming Material

The pore-forming material is burned off before cordierite is synthesized in a cordierite-sintering process, forming pores. The pore-forming material used has a median diameter of 30-70 μm. When the median diameter is less than 30 μm, a few pores having relatively large diameters are formed, failing to keep low pressure loss. When the median diameter exceeds 70 μm, too large pores are formed, failing to achieve sufficient strength. The median diameter of the pore-forming material is preferably 40-60 μm.

In a curve showing the relation between the particle diameters of the pore-forming material particles and their cumulative volume (the accumulated volume of particles having diameters equal to or less than a particular diameter), it is preferable that the particle diameter d9 corresponding to a cumulative volume of 90% is 50-90 μm. When the particle diameter d90 is less than 50 μm, cell wall surfaces have many pores having smaller diameters than those of pores in the cell walls, likely resulting in the deterioration of pressure loss characteristics. The d9 exceeding 90 μm means a large maximum pore diameter measured by the bubble point method, likely resulting in a low efficiency of capturing nano-sized PM. The particle diameter d90 is preferably 60-80 μm. The diameters of pore-forming material particles can be measured, for example, by a particle size distribution meter (Microtrack MT3000 available from Nikkiso Co., Ltd.).

Usable for the pore-forming material are flour, graphite, starch powder, solid or hollow resins (polymethylmethacrylate, polybutylmethacrylate, polyacrylate, polystyrene, polyethylene, polyethylene terephthalate, methylmethacrylate-acrylonitrile copolymers, etc.), etc. Preferable among them are hollow resin particles, particularly hollow particles of methylmethacrylate-acrylonitrile copolymers. The hollow resin particles preferably have shells as thick as 0.1-2 μm and contain a gas such as hydrocarbons, etc. They preferably contain 70-95% of moisture. With the moisture contained, the resin particles have such improved slidability that they are not easily broken in their mixing, blending and molding.

The amount of the pore-forming material added is preferably set in such a range as to provide low pressure loss while securing high strength, depending on its type. When hollow resin particles are used as the pore-forming material, their amount is preferably 1-15%. With less than 1%, a small amount of pores are formed by the pore-forming material, likely failing to keep low pressure loss. With more than 15%, too many pores are formed, likely failing to have sufficient strength. The amount of the pore-forming material added is more preferably more than 6% and 15% or less, most preferably 6.5-13%. When the pore-forming material is flour, graphite, starch powder, etc., its amount is preferably in a range of 5-70%.

(f) Classification of Cordierite-Forming Material

The cordierite-forming material comprising silica particles, talc particles, kaolin particles, alumina particles, etc., is classified by passing through a sieve with openings of 250 μm or less. Coarse particles are removed by the sieve from the cordierite-forming material, preventing pores on and in the cell walls from becoming large. The sieve openings are preferably 220 μm or less.

(g) Production Method

A moldable material for the extrusion molding of a ceramic honeycomb filter is produced by mixing the cordierite-forming material comprising silica particles, talc particles, kaolin particles, alumina particles, etc. with the pore-forming material, a binder, etc., without using pulverization media like a Henschel mixer, etc., and blended with water without excess shearing like a kneader, etc. By mixing without using pulverization media, silica particles (particularly amorphous silica particles) and the pore-forming material are not broken in the mixing step, so that the extruded molding contains silica particles and the pore-forming material having desired particle size distributions and particle shapes without deformation, resulting in a ceramic honeycomb filter meeting both requirements of pressure loss characteristics and PM-capturing efficiency. Particularly when high-sphericity silica and hollow resin particles as the pore-forming material are used, the mixing method is effective. When pulverization media are used like a ball mill, etc. in the mixing step, silica particles (particularly high-sphericity silica particles), and hollow resin particles as the pore-forming material are broken in the mixing step, so that their shapes and particle sizes are changed, failing to obtain a desired pore structure.

The ceramic honeycomb structure is produced by extruding the plasticized moldable material through a die by a known method to faun a honeycomb molding, drying it, machining its end surfaces and peripheral surface, etc., if necessary, and sintering it. The sintering is conducted in a continuous or batch furnace, with heating and cooling speeds adjusted. When the ceramic material is a cordierite-forming material, it is kept at 1350-1450° C. for 1-50 hours to cause main cordierite crystals sufficiently grow, and then cooled to room temperature. Particularly when a large ceramic honeycomb structure of 150 mm or more in outer diameter and 150 mm or more in length is produced, the heating speed is preferably 0.2-10° C./hour in a temperature range of decomposing the binder (for example, between 150° C. and 350° C.), and 5-20° C./hour in a temperature range of causing a cordierite-forming reaction (for example, between 1150° C. and 1400° C.), to avoid the cracking of moldings in the sintering step. The cooling is preferably conducted at a speed of 20-40° C./hour particularly in a range of 1400-1300° C.

The resultant honeycomb ceramic structure is plugged at desired flow path ends or inside desired flow paths by a known method, to form a ceramic honeycomb filter. The plugging may be conducted before sintering.

The present invention will be explained in further detail by Examples below, without intention of restricting the present invention thereto.

Starting material powders of silica, kaolin, talc, alumina and aluminum hydroxide having the characteristics (median diameters, impurities, etc.) shown in Tables 1-4 are classified by passing through a sieve with opening diameters of 212 µm, and mixed by the formulations shown in Table 6, to obtain cordierite-forming material powders having a chemical composition comprising 51% by mass of $SiO_2$, 35% by mass of $Al_2O_3$ and 14% by mass of MgO. Each of the cordierite-forming material powders was mixed with each pore-forming material shown in Table 5 in an amount shown in Table 6, and methylcellulose, and blended with water to prepare a ceramic moldable material composed of the cordierite-forming material.

The median diameters and particle size distributions of silica, kaolin, talc, alumina, aluminum hydroxide, and the pore-forming materials were measured by a particle size distribution meter (Microtrack MT3000). The sphericity of each silica particle was determined from an electron photomicrograph of the particle by an image analyzer by the formula of A1/A2, wherein A1 was a projected area of the silica particle, and A2 was an area of a circle having a diameter corresponding to the longest straight line passing a center of gravity of the silica particle and connecting two points on a periphery of the silica particle, and the resultant sphericity values of 20 silica particles were averaged to obtain the sphericity of silica particles.

The resultant moldable material was extruded to form a honeycomb structure molding, dried, machined to remove its peripheral portions, and sintered in a furnace for 200 hours by a schedule comprising temperature elevation at an average speed of 10° C./hour from room temperature to 150° C., at an average speed of 2° C./hour from 150° C. to 350° C., at an average speed of 20° C./hour from 350° C. to 1150° C., and at an average speed of 15° C./hour from 1150° C. to 1400° C., keeping the highest temperature of 1410° C. for 24 hours, and cooling at an average speed of 30° C./hour from 1400° C. to 1300° C., and at an average speed of 80° C./hour from 1300° C. to 100° C.

Peripheries of the sintered ceramic honeycombs were coated with a skin material comprising amorphous silica and colloidal silica, and dried to obtain the ceramic honeycomb structures of Examples 1-16 and Comparative Examples 1-12 each having an outer diameter of 266.7 mm, a length of 304.8 mm, a cell wall thickness of 300 µm, and a cell density of 260 cells/inch$^2$.

Flow path ends of each ceramic honeycomb structure were alternately plugged with a cordierite-forming, plugging material slurry, which was dried and sintered to produce each cordierite-type ceramic honeycomb filter of Examples 1-16 and Comparative Examples 1-12. The sintered plugs were as long as 5-10 mm.

The resultant ceramic honeycomb filters of Examples 1-16 and Comparative Examples 1-12 were measured with respect to a pore distribution by mercury porosimetry, pore diameters by a bubble point method, a thermal expansion coefficient, the amount of crystals, a bulk density, permeability, pressure loss when 2 g/liter of soot was captured, capturing efficiency, bending strength and a Young's modulus. The results are shown in Table 7.

The bubble point method and the mercury porosimetry were conducted on test pieces cut out of the honeycomb filters. Measured on cell walls by the mercury porosimetry were a total pore volume, porosity, a median pore diameter A, a ratio of the volume of pores having diameters of 15-40 µm to the total pore volume, and a ratio of the volume of pores having diameters of more than 50 µm to the total pore volume, and measured on cell walls by the bubble point method were a median pore diameter B, and the maximum pore diameter.

The mercury porosimetry was conducted by putting a test piece (10 mm×10 mm×10 mm) cut out of the ceramic honeycomb filter in a measurement cell of Autopore III available from Micromeritics, evacuating the cell, introducing mercury into the cell under pressure, and determining the relation between the pressure and the volume of mercury introduced into pores in the test piece. Determined from the relation between the pressure and the volume of mercury was the relation between the pore diameter and the cumulative pore volume. With mercury pressure of 0.5 psi (0.35× $10^{-3}$ kg/mm$^2$), the pore diameter was calculated from the pressure, using a contact angle of 130° and a surface tension of 484 dyne/cm. The porosity was calculated from the measured total pore volume, using 2.52 g/cm$^3$ as the true density of cordierite.

The measurement of pores by the bubble point method was conducted on a test piece cut out of the ceramic honeycomb filter, which was contained in PermPorometer CFP1100AEX available from Porous Materials, Inc., with a perfluoropolyester (trade name "Galwick") dropped thereonto.

The measurement of the thermal expansion coefficient (CTE) between 20° C. and 800° C. was conducted on a test piece cut out of the honeycomb filter.

The amounts of crystals, cordierite, spinel and cristobalite, were determined from main peak intensities of the crystals obtained by X-ray diffraction measurement. With the X-ray diffraction pattern of a powder sample of the ceramic honeycomb filter obtained in a range of 2θ=8-40° using an X-ray diffractometer (Cu-Kα) available from Rigaku Corporation, the main peak intensities of crystals (the highest diffraction peak intensities of the crystals in an X-ray diffraction pattern) were determined from the diffraction intensity $I_{cordierite\ (102)}$ of the (102) plane of cordierite, the diffraction intensity $I_{spinel\ (220)}$ of the (220) plane of spinel, and the diffraction intensity $I_{cristobalite\ (200)}$ of the (200) plane of cristobalite in the X-ray diffraction pattern, with their values converted. The conversion of the measured intensities to the main peak intensities [X-ray diffraction intensities of the (500) plane of cordierite, the (311) plane of spinel, and the (101) plane of cristobalite] was conducted by the following formulae:

X-ray diffraction intensity of cordierite crystal= $(I_{cordierite\ (102)}/50)\times 100$, X-ray diffraction intensity of spinel crystal= $(I_{spinel\ (220)}/40)\times 100$, and X-ray diffraction intensity of cristobalite crystal = $(I_{cristobalite\ (200)}/13)\times 100$, using an intensity ratio to the main peak intensity of each crystal, 50% for the (102) plane of cordierite, 40% for the (220) plane of spinel, and 13% for the (200) plane of cristobalite, which are described in JCPDS cards. Such conversion avoids, for example, the problem that exact intensities cannot be determined because crystals' main peaks are overlapping, enabling the comparison of the amounts of crystals with higher precision.

The amount of each crystal (cordierite, spinel, and cristobalite) was determined by dividing the main peak intensity of each crystal by their sum. For example, the amount of spinel crystal was determined by the formula:

$(I_{spinel\ (220)}/40)\times 100/[(I_{cordierite\ (102)}/50)\times 100+(I_{spinel\ (220)}/40)\times 100+(I_{cristobalite\ (200)}/13)\times 100]$.

The bulk filter density was determined by dividing the mass of the honeycomb filter by the volume of the honeycomb filter.

The permeability was the maximum permeability measured by Perm Automated Porometer (registered trademark) Ver. 6.0 available from Porous Materials, Inc., with the flow rate of air increasing from 30 cc/sec to 400 cc/sec. Evaluation in Table 7 was as follows:
Excellent: When the permeability was more than $3\times 10^{-12}$ m$^2$ and $8\times 10^{-12}$ m$^2$ or less,
Good: When the permeability was $2\times 10^{-12}$ m$^2$ to $3\times 10^{-12}$ m$^2$, or more than $8\times 10^{-12}$ m$^2$ and $10\times 10^{-12}$ m$^2$ or less, and
Poor: When the permeability was less than $2\times 10^{-12}$ m$^2$ or more than $10\times 10^{-12}$ m$^2$.

The pressure loss when 2 g/liter of soot was captured (soot-capturing pressure loss) was measured on a ceramic honeycomb filter fixed to a pressure loss test stand, to which carbon powder (soot) having an average particle size of 0.042 μm was supplied at a rate of 3 g/hour together with air in a flow rate of 10 Nm$^3$/min, and expressed by pressure difference between the inlet side and the outlet side (pressure loss) when the amount of soot accumulated per 1 liter of the filter reached 2 g. The soot-capturing pressure loss was evaluated as follows:
Excellent When the pressure loss was 1.2 kPa or less,
Good When the pressure loss was more than 1.2 kPa and 1.5 kPa or less,
Poor When the pressure loss was more than 1.5 kPa.

Supplying carbon powder having an average particle size of 0.042 μm at a rate of 3 g/hour together with air at a flow rate of 10 Nm$^3$/min to a ceramic honeycomb filter fixed to a pressure loss test stand, the numbers of carbon particles flowing into and out of the honeycomb filter per 1 minute were counted by a scanning mobility particle sizer (SMPS, Model 3936 available from TIS), to determine the capturing efficiency by the formula of $(N_{in}-N_{out})/N_{in}$, wherein $N_{in}$ represents the number of carbon particles flowing into the honeycomb filter, and $N_{out}$ represents the number of carbon particles flowing out of the honeycomb filter, both for 1 minute between 20 minutes and 21 minutes from the start of supply. The capturing efficiency was evaluated by the following standards:
Excellent: When the value of the above formula was 98% or more,
Good: When the value of the above formula was 95% or more and less than 98%, and
Poor: When the value of the above formula was less than 95%.

The measurement of the bending strength and the Young's modulus was conducted on a honeycomb rod of 100 mm in length, 12 mm in thickness in parallel to the flow path direction, and 25 mm in width, which was cut out of the ceramic honeycomb filter in the flow path direction, by a 4-point bending test method with a distance of 80 mm between lower fulcrums and with a distance of 40 mm between upper fulcrums.

TABLE 1

| Starting Material | Median Diameter (μm) | Sphericity | Impurities (%) | | |
|---|---|---|---|---|---|
| | | | CaO | Na$_2$O | K$_2$O |
| Silica A | 45 | 0.70 | 0.001 | 0.0021 | 0.0024 |
| Silica B | 58 | 0.70 | 0.001 | 0.0021 | 0.0024 |
| Silica C | 15 | 0.70 | 0.001 | 0.0021 | 0.0024 |
| Silica D | 45 | 0.90 | 0.001 | 0.0017 | 0.0021 |
| Silica E | 45 | 0.50 | 0.001 | 0.0017 | 0.0021 |
| Silica F | 70 | 0.70 | 0.001 | 0.0024 | 0.0023 |
| Silica G | 10 | 0.70 | 0.001 | 0.0024 | 0.0023 |
| Silica H | 45 | 0.40 | 0.001 | 0.0024 | 0.0025 |

TABLE 2

| Starting Material | Median Diameter (μm) | Cleavage Index | Impurities (%) | | |
|---|---|---|---|---|---|
| | | | CaO | Na$_2$O | K$_2$O |
| Kaolin A | 4.5 | 0.95 | 0.19 | 0.03 | 0.09 |
| Kaolin B | 7.5 | 0.95 | 0.20 | 0.03 | 0.08 |
| Kaolin C | 1.5 | 0.95 | 0.20 | 0.03 | 0.08 |
| Kaolin D | 4.5 | 0.90 | 0.19 | 0.03 | 0.09 |
| Kaolin E | 10.0 | 0.95 | 0.19 | 0.03 | 0.09 |
| Kaolin F | 0.1 | 0.95 | 0.19 | 0.03 | 0.09 |
| Kaolin G | 4.5 | 0.70 | 0.19 | 0.03 | 0.09 |

TABLE 3

| Starting Material | Median Diameter (μm) | Morphology Index | Impurities (%) | | | |
|---|---|---|---|---|---|---|
| | | | CaO | Na$_2$O | K$_2$O | Fe$_2$O$_3$ |
| Talc A | 14.0 | 0.84 | 0.47 | 0.001 | 0.001 | 1.1 |
| Talc B | 25.0 | 0.83 | 0.48 | 0.001 | 0.001 | 1.1 |

TABLE 3-continued

| Starting Material | Median Diameter (μm) | Morphology Index | Impurities (%) | | | |
|---|---|---|---|---|---|---|
| | | | CaO | Na$_2$O | K$_2$O | Fe$_2$O$_3$ |
| Talc C | 10.0 | 0.83 | 0.48 | 0.001 | 0.001 | 1.1 |
| Talc D | 14.0 | 0.77 | 0.49 | 0.001 | 0.001 | 1.1 |
| Talc E | 30.0 | 0.84 | 0.49 | 0.001 | 0.001 | 1.1 |
| Talc F | 5.0 | 0.84 | 0.49 | 0.001 | 0.001 | 1.0 |
| Talc G | 14.0 | 0.60 | 0.49 | 0.001 | 0.001 | 1.0 |

TABLE 4

| Starting Material | Median Diameter (μm) | Impurities (%) | | |
|---|---|---|---|---|
| | | CaO | Na$_2$O | K$_2$O |
| Alumina A | 4.0 | 0.001 | 0.28 | 0.001 |
| Alumina B | 6.0 | 0.001 | 0.30 | 0.001 |
| Alumina C | 1.5 | 0.001 | 0.30 | 0.001 |
| Alumina D | 8.0 | 0.001 | 0.30 | 0.001 |
| Alumina E | 0.2 | 0.001 | 0.30 | 0.001 |
| Aluminum Hydroxide A | 1.8 | 0.001 | 0.04 | 0.001 |
| Aluminum Hydroxide B | 7.0 | 0.001 | 0.04 | 0.001 |

TABLE 5

| Starting Material | Material | Median Diameter (μm) | d90 (μm) |
|---|---|---|---|
| Pore-Forming Material A | Foamed Resin* | 48.0 | 69.0 |
| Pore-Forming Material B | Graphite | 70.0 | 90.0 |
| Pore-Forming Material C | Flour | 30.0 | 50.0 |
| Pore-Forming Material D | Graphite | 90.0 | 115.0 |

Note:
*Having a shell thickness of 1 μm with the water content of 90%.

TABLE 6

| No. | Silica | | Kaolin | | Talc | |
|---|---|---|---|---|---|---|
| | Type | Amount (%) | Type | Amount (%) | Type | Amount (%) |
| Example 1 | A | 18.2 | A | 6.0 | A | 41.2 |
| Example 2 | B | 18.2 | A | 6.0 | A | 41.2 |
| Example 3 | C | 18.2 | A | 6.0 | A | 41.2 |
| Example 4 | D | 18.2 | A | 6.0 | A | 41.2 |
| Example 5 | E | 18.1 | A | 6.0 | A | 41.3 |
| Comp. Ex. 1 | F | 18.1 | A | 6.0 | A | 41.3 |
| Comp. Ex. 2 | G | 18.1 | A | 6.0 | A | 41.3 |
| Example 6 | H | 18.1 | A | 6.0 | A | 41.3 |
| Example 7 | A | 18.1 | B | 6.0 | A | 41.3 |
| Example 8 | A | 18.1 | C | 6.0 | A | 41.3 |
| Example 9 | A | 18.2 | D | 6.0 | A | 41.2 |
| Comp. Ex. 3 | A | 18.2 | E | 6.0 | A | 41.2 |
| Comp. Ex. 4 | A | 18.2 | F | 6.0 | A | 41.2 |
| Comp. Ex. 5 | A | 18.2 | G | 6.0 | A | 41.2 |
| Example 10 | A | 18.2 | A | 6.0 | B | 41.2 |
| Example 11 | A | 18.2 | A | 6.0 | C | 41.2 |
| Example 12 | A | 18.2 | A | 6.0 | D | 41.2 |
| Comp. Ex. 6 | A | 18.2 | A | 6.0 | E | 41.2 |
| Comp. Ex. 7 | A | 18.2 | A | 6.0 | F | 41.2 |
| Comp. Ex. 8 | A | 18.2 | A | 6.0 | G | 41.2 |
| Example 13 | A | 18.2 | A | 6.0 | A | 41.2 |
| Example 14 | A | 18.2 | A | 6.0 | A | 41.2 |
| Comp. Ex. 9 | A | 18.2 | A | 6.0 | A | 41.2 |
| Comp. Ex. 10 | A | 18.2 | A | 6.0 | A | 41.2 |
| Comp. Ex. 11 | A | 18.2 | A | 6.0 | A | 41.2 |
| Example 15 | A | 18.2 | A | 6.0 | A | 41.2 |
| Example 16 | A | 18.2 | A | 6.0 | A | 41.2 |
| Comp. Ex. 12 | A | 18.2 | A | 6.0 | A | 41.2 |

| No. | Alumina | | Aluminum Hydroxide | | Pore-Forming Material | |
|---|---|---|---|---|---|---|
| | Type | Amount (%) | Type | Amount (%) | Type | Amount (%) |
| Example 1 | A | 23.3 | A | 11.3 | A | 8.0 |
| Example 2 | A | 23.3 | A | 11.3 | A | 8.0 |
| Example 3 | A | 23.3 | A | 11.3 | A | 8.0 |
| Example 4 | A | 23.3 | A | 11.3 | A | 8.0 |
| Example 5 | A | 23.3 | A | 11.3 | A | 8.0 |
| Comp. Ex. 1 | A | 23.3 | A | 11.3 | A | 8.0 |
| Comp. Ex. 2 | A | 23.3 | A | 11.3 | A | 8.0 |
| Example 6 | A | 23.3 | A | 11.3 | A | 8.0 |
| Example 7 | A | 23.3 | A | 11.3 | A | 8.0 |
| Example 8 | A | 23.3 | A | 11.3 | A | 8.0 |
| Example 9 | A | 23.3 | A | 11.3 | A | 8.0 |
| Comp. Ex. 3 | A | 23.3 | A | 11.3 | A | 8.0 |
| Comp. Ex. 4 | A | 23.3 | A | 11.3 | A | 8.0 |
| Comp. Ex. 5 | A | 23.3 | A | 11.3 | A | 8.0 |
| Example 10 | A | 23.3 | A | 11.3 | A | 8.0 |
| Example 11 | A | 23.3 | A | 11.3 | A | 8.0 |
| Example 12 | A | 23.3 | A | 11.3 | A | 8.0 |
| Comp. Ex. 6 | A | 23.3 | A | 11.3 | A | 8.0 |
| Comp. Ex. 7 | A | 23.3 | A | 11.3 | A | 8.0 |
| Comp. Ex. 8 | A | 23.3 | A | 11.3 | A | 8.0 |
| Example 13 | B | 23.3 | A | 11.3 | A | 8.0 |
| Example 14 | C | 23.3 | A | 11.3 | A | 8.0 |
| Comp. Ex. 9 | D | 23.3 | A | 11.3 | A | 8.0 |
| Comp. Ex. 10 | E | 23.3 | A | 11.3 | A | 8.0 |
| Comp. Ex. 11 | A | 23.3 | B | 11.3 | A | 8.0 |
| Example 15 | A | 23.3 | A | 11.3 | B | 25.0 |
| Example 16 | A | 23.3 | A | 11.3 | C | 20.0 |
| Comp. Ex. 12 | A | 23.3 | A | 11.3 | D | 25.0 |

TABLE 7

| No. | Measurement Results of Pores Mercury Porosimetry | | | | |
|---|---|---|---|---|---|
| | Total Pore Volume (cm$^3$/g) | Porosity (%) | Median Pore Diameter A (μm) | Pore Volume of 15-40 μm[1] (%) | Pore Volume of More Than 50 μm[2] (%) |
| Example 1 | 0.588 | 59.7 | 26.6 | 70.3 | 11.6 |
| Example 2 | 0.685 | 63.3 | 33.0 | 68.4 | 12.1 |
| Example 3 | 0.460 | 53.7 | 25.0 | 70.8 | 11.4 |
| Example 4 | 0.599 | 60.2 | 26.1 | 68.7 | 13.5 |
| Example 5 | 0.561 | 58.6 | 25.4 | 62.4 | 17.5 |
| Comp. Ex. 1 | 0.698 | 63.8 | 34.0 | 60.0 | 21.2 |

TABLE 7-continued

| | | | | | |
|---|---|---|---|---|---|
| Comp. Ex. 2 | 0.413 | 51.0 | 23.0 | 71.7 | 10.2 |
| Example 6 | 0.550 | 58.1 | 25.1 | 60.7 | 22.1 |
| Example 7 | 0.598 | 60.1 | 26.1 | 72.0 | 12.1 |
| Example 8 | 0.608 | 60.5 | 25.5 | 70.7 | 13.2 |
| Example 9 | 0.597 | 60.1 | 26.7 | 68.7 | 12.2 |
| Comp. Ex. 3 | 0.595 | 60.0 | 26.3 | 72.0 | 12.0 |
| Comp. Ex. 4 | 0.580 | 59.4 | 26.5 | 71.9 | 13.1 |
| Comp. Ex. 5 | 0.611 | 60.6 | 25.9 | 69.1 | 12.5 |
| Example 10 | 0.611 | 60.6 | 26.9 | 63.7 | 18.0 |
| Example 11 | 0.580 | 59.4 | 26.3 | 78.1 | 10.6 |
| Example 12 | 0.607 | 60.5 | 26.8 | 69.5 | 11.8 |
| Comp. Ex. 6 | 0.610 | 60.6 | 26.9 | 58.4 | 21.0 |
| Comp. Ex. 7 | 0.577 | 59.3 | 25.6 | 82.8 | 9.2 |
| Comp. Ex. 8 | 0.601 | 60.2 | 26.7 | 69.7 | 11.5 |
| Example 13 | 0.605 | 60.4 | 26.3 | 67.9 | 13.3 |
| Example 14 | 0.591 | 59.8 | 25.7 | 73.0 | 10.3 |
| Comp. Ex. 9 | 0.612 | 60.7 | 26.8 | 64.9 | 16.3 |
| Comp. Ex. 10 | 0.570 | 59.0 | 25.5 | 80.2 | 9.2 |
| Comp. Ex. 11 | 0.601 | 60.2 | 26.5 | 65.5 | 16.5 |
| Example 15 | 1.132 | 74.0 | 34.0 | 60.7 | 19.7 |
| Example 16 | 0.480 | 54.7 | 25.0 | 78.3 | 10.4 |
| Comp. Ex. 12 | 1.240 | 75.8 | 38.0 | 50.2 | 25.4 |

Note:
[1] A ratio of the volume of pores having diameters of 15-40 μm to the total pore volume.
[2] A ratio of the volume of pores having diameters of more than 50 μm to the total pore volume.

Measurement results of Pores

| | Bubble Point Method | | |
|---|---|---|---|
| No. | Median Pore Diameter B (μm) | Maximum Pore Diameter (μm) | $(A - B)/B \times 100$ (%) |
| Example 1 | 17.8 | 45.0 | 49.5 |
| Example 2 | 20.3 | 79.0 | 62.6 |
| Example 3 | 16.5 | 41.0 | 51.5 |
| Example 4 | 17.0 | 50.1 | 53.5 |
| Example 5 | 16.0 | 39.0 | 58.8 |
| Comp. Ex. 1 | 25.5 | 104.0 | 33.3 |
| Comp. Ex. 2 | 13.0 | 32.0 | 76.9 |
| Example 6 | 15.0 | 30.0 | 67.3 |
| Example 7 | 19.3 | 85.0 | 35.2 |
| Example 8 | 15.1 | 39.0 | 68.9 |
| Example 9 | 18.1 | 49.0 | 47.5 |
| Comp. Ex. 3 | 20.1 | 101.0 | 30.8 |
| Comp. Ex. 4 | 14.9 | 31.0 | 77.9 |
| Comp. Ex. 5 | 18.0 | 48.5 | 43.9 |
| Example 10 | 19.8 | 96.0 | 35.9 |
| Example 11 | 16.1 | 39.0 | 63.4 |
| Example 12 | 18.0 | 46.0 | 48.9 |
| Comp. Ex. 6 | 21.9 | 109.0 | 22.8 |
| Comp. Ex. 7 | 13.5 | 27.0 | 89.6 |
| Comp. Ex. 8 | 18.1 | 45.8 | 47.5 |
| Example 13 | 19.2 | 89.0 | 37.0 |
| Example 14 | 15.2 | 36.0 | 69.1 |
| Comp. Ex. 9 | 21.8 | 108.0 | 22.9 |
| Comp. Ex. 10 | 13.4 | 26.6 | 90.3 |
| Comp. Ex. 11 | 21.7 | 108.0 | 22.1 |
| Example 15 | 20.2 | 92.0 | 68.3 |
| Example 16 | 18.0 | 66.0 | 38.9 |
| Comp. Ex. 12 | 21.0 | 112.0 | 81.0 |

| | Crystals | | | Bulk Density | | Bending | Young's |
|---|---|---|---|---|---|---|---|
| No. | Cordierite (%) | Spinel (%) | Cristobalite (%) | of Filter (g/cm³) | TEC[1] ($\times 10^{-7}/°$ C.) | Strength (MPa) | modulus (Gpa) |
| Example 1 | 91 | 4.0 | 4.5 | 0.35 | 7.1 | 2.9 | 1.1 |
| Example 2 | 91 | 4.0 | 4.5 | 0.32 | 7.2 | 1.2 | 1.0 |
| Example 3 | 91 | 4.0 | 4.5 | 0.41 | 7.1 | 2.5 | 1.1 |
| Example 4 | 91 | 4.0 | 4.5 | 0.35 | 7.0 | 2.8 | 1.2 |
| Example 5 | 91 | 4.0 | 4.5 | 0.36 | 7.2 | 1.8 | 1.0 |
| Comp. Ex. 1 | 91 | 4.0 | 4.5 | 0.32 | 7.2 | 0.8 | 1.0 |
| Comp. Ex. 2 | 90 | 3.5 | 4.5 | 0.43 | 7.1 | 2.5 | 1.1 |
| Example 6 | 91 | 3.5 | 4.5 | 0.37 | 7.0 | 2.3 | 1.0 |
| Example 7 | 91 | 4.0 | 4.5 | 0.35 | 7.0 | 2.6 | 0.9 |
| Example 8 | 91 | 4.0 | 4.5 | 0.35 | 7.0 | 2.8 | 1.0 |
| Example 9 | 91 | 4.0 | 4.5 | 0.35 | 12.0 | 2.6 | 1.0 |
| Comp. Ex. 3 | 91 | 4.0 | 4.5 | 0.35 | 7.1 | 2.1 | 1.0 |

TABLE 7-continued

| | | | | | | | |
|---|---|---|---|---|---|---|---|
| Comp. Ex. 4 | 91 | 4.0 | 4.5 | 0.36 | 7.1 | 2.1 | 1.0 |
| Comp. Ex. 5 | 91 | 4.0 | 4.5 | 0.35 | 14.0 | 2.5 | 1.1 |
| Example 10 | 91 | 4.0 | 4.5 | 0.35 | 7.1 | 2.5 | 0.8 |
| Example 11 | 91 | 4.0 | 5.0 | 0.36 | 7.1 | 2.7 | 0.9 |
| Example 12 | 91 | 4.0 | 5.0 | 0.35 | 12.5 | 2.5 | 1.0 |
| Comp. Ex. 6 | 91 | 4.0 | 5.0 | 0.35 | 7.2 | 1.8 | 0.9 |
| Comp. Ex. 7 | 91 | 4.0 | 5.0 | 0.36 | 7.1 | 2.5 | 1.1 |
| Comp. Ex. 8 | 91 | 4.0 | 5.0 | 0.35 | 15.1 | 2.5 | 1.0 |
| Example 13 | 91 | 4.0 | 5.0 | 0.35 | 11.4 | 2.4 | 0.9 |
| Example 14 | 91 | 4.0 | 5.0 | 0.35 | 5.6 | 2.5 | 0.8 |
| Comp. Ex. 9 | 91 | 4.0 | 5.0 | 0.35 | 14.8 | 1.8 | 0.9 |
| Comp. Ex. 10 | 91 | 4.0 | 5.0 | 0.36 | 3.5 | 2.5 | 1.1 |
| Comp. Ex. 11 | 91 | 4.0 | 5.0 | 0.35 | 14.6 | 1.9 | 0.9 |
| Example 15 | 91 | 4.0 | 5.0 | 0.23 | 7.2 | 1.5 | 0.8 |
| Example 16 | 91 | 4.0 | 5.0 | 0.40 | 7.1 | 2.0 | 0.9 |
| Comp. Ex. 12 | 91 | 4.0 | 5.0 | 0.21 | 7.0 | 0.9 | 0.9 |

Note:
[1] A thermal expansion coefficient between 20° C. and 800° C.

Evaluation Results

| No. | Permeability ($\times 10^{-12}$ m$^2$) | | Pressure Loss When 2 g/L of Soot Was Captured (kPa) | | Capturing Efficiency | |
|---|---|---|---|---|---|---|
| Example 1 | 4.5 | Excellent | 1.2 | Excellent | 98.5 | Excellent |
| Example 2 | 7.5 | Excellent | 0.1 | Excellent | 95.8 | Good |
| Example 3 | 2.4 | Good | 1.4 | Good | 98.6 | Excellent |
| Example 4 | 4.9 | Excellent | 1.1 | Excellent | 98.9 | Excellent |
| Example 5 | 2.2 | Good | 1.5 | Good | 98.0 | Excellent |
| Comp. Ex. 1 | 8.5 | Good | 0.1 | Excellent | 93.0 | Poor |
| Comp. Ex. 2 | 1.1 | Poor | 1.7 | Poor | 98.6 | Excellent |
| Example 6 | 2.0 | Good | 1.5 | Good | 98.8 | Excellent |
| Example 7 | 5.1 | Excellent | 1.2 | Excellent | 95.5 | Good |
| Example 8 | 2.5 | Good | 1.4 | Good | 99.0 | Excellent |
| Example 9 | 4.6 | Excellent | 1.2 | Excellent | 98.2 | Excellent |
| Comp. Ex. 3 | 5.5 | Excellent | 1.2 | Excellent | 93.0 | Poor |
| Comp. Ex. 4 | 1.8 | Poor | 1.6 | Poor | 98.8 | Excellent |
| Comp. Ex. 5 | 4.6 | Excellent | 1.2 | Excellent | 98.2 | Excellent |
| Example 10 | 6.0 | Excellent | 1.2 | Excellent | 95.7 | Good |
| Example 11 | 2.3 | Good | 1.5 | Good | 98.9 | Excellent |
| Example 12 | 4.4 | Excellent | 1.2 | Excellent | 98.5 | Excellent |
| Comp. Ex. 6 | 5.6 | Excellent | 1.1 | Excellent | 91.0 | Poor |
| Comp. Ex. 7 | 1.5 | Poor | 1.6 | Poor | 98.7 | Excellent |
| Comp. Ex. 8 | 4.5 | Excellent | 1.2 | Excellent | 98.6 | Excellent |
| Example 13 | 5.9 | Excellent | 1.2 | Excellent | 95.4 | Good |
| Example 14 | 2.4 | Good | 1.4 | Good | 98.8 | Excellent |
| Comp. Ex. 9 | 5.7 | Excellent | 1.1 | Excellent | 90.7 | Poor |
| Comp. Ex. 10 | 1.4 | Poor | 1.6 | Poor | 98.6 | Excellent |
| Comp. Ex. 11 | 5.8 | Excellent | 1.2 | Excellent | 90.5 | Poor |
| Example 15 | 7.5 | Excellent | 1.0 | Excellent | 95.0 | Good |
| Example 16 | 2.4 | Good | 1.4 | Good | 99.1 | Excellent |
| Comp. Ex. 12 | 8.0 | Excellent | 0.8 | Excellent | 85.0 | Poor |

It is clear from Table 7 that the ceramic honeycomb filters of Examples 1-16 within the present invention had improved efficiency of capturing PM, particularly nano-sized PM, with low pressure loss.

On the other hand, the ceramic honeycomb filter of Comparative Example 1 using silica F having a median diameter of more than 60 μm had extremely low PM-capturing efficiency, with the maximum pore diameter determined by the bubble point method being more than 100 μm, and the value of [(A−B)/B×100], wherein A represents the median pore diameter of cell walls measured by mercury porosimetry, and B represents the median pore diameter of cell walls measured by the bubble point method, being 35% or less. The ceramic honeycomb filter of Comparative Example 2 using silica G having a median diameter of less than 15 μm had low permeability and large soot-capturing pressure loss, with the value of [(A−B)/B×100] being more than 70%.

The ceramic honeycomb filter of Comparative Example 3 using kaolin E having a median diameter of more than 8 μm had extremely low PM-capturing efficiency, with the maximum pore diameter determined by the bubble point method being more than 100 μm, and the value of [(A−B)/B×100] being 35% or less. The ceramic honeycomb filter of Comparative Example 4 using kaolin F having a median diameter of less than 1 μM had low permeability and large soot-capturing pressure loss, with the value of [(A−B)/B×100] being more than 70%. The ceramic honeycomb filter of Comparative Example 5 using kaolin G having a cleavage index of less than 0.9 had a thermal expansion coefficient of more than 13×10$^{-7}$/° C. between 20° C. and 800° C.

The ceramic honeycomb filter of Comparative Example 6 using talc E having a median diameter of more than 25 μm had extremely low PM-capturing efficiency, with the maximum pore diameter determined by the bubble point method being more than 100 μm, and the value of [(A−B)/B×100] being 35% or less. The ceramic honeycomb filter of Comparative Example 7 using talc F having a median diameter of less than 10 μm had low permeability and large soot-capturing pressure loss, with the value of [(A−B)/B×100] being more than 70%. The ceramic honeycomb filter of Comparative Example 8 using talc G having a morphology index of less than 0.77 had a thermal expansion coefficient of more than $13 \times 10^{-7}/°$ C. between 20° C. and 800° C.

The ceramic honeycomb filter of Comparative Example 9 using alumina D having a median diameter of more than 6 μm had extremely low PM-capturing efficiency, and a thermal expansion coefficient of more than $13 \times 10^{-7}/°$ C. between 20° C. and 800° C., with the maximum pore diameter determined by the bubble point method being more than 100 μm, and the value of [(A−B)/B×100] being 35% or less. The ceramic honeycomb filter of Comparative Example 10 using alumina E having a median diameter of less than 1 μm had low permeability and large soot-capturing pressure loss, with the value of [(A−B)/B×100] exceeding 70%. The ceramic honeycomb filter of Comparative Example 11 using aluminum hydroxide B having a median diameter of more than 6 μm had extremely low PM-capturing efficiency and a thermal expansion coefficient of $13 \times 10^{-7}/°$ C. between 20° C. and 800° C., with the maximum pore diameter determined by the bubble point method being more than 100 μm, and the value of [(A−B)/B×100] being 35% or less.

The ceramic honeycomb filter of Comparative Example 12 using the pore-forming material D having a median diameter of more than 70 μm had extremely low PM-capturing efficiency, with the maximum pore diameter determined by the bubble point method being more than 100 μm, and the value of [(A−B)/B×100] being more than 70%.

EFFECT OF THE INVENTION

Because the ceramic honeycomb filters of the present invention have low pressure loss, as well as improved efficiency of capturing PM, particularly nano-sized PM having large influence on humans, they are suitable as exhaust gas filters for diesel engines.

What is claimed is:

1. A method for producing a ceramic honeycomb filter comprising the steps of preparing a cordierite-forming material containing talc, silica, an alumina source and kaolin; classifying the cordierite-forming material by passing the cordierite-forming material through a sieve having opening diameters of 250 μm or less to form a classified cordierite-forming material; blending the classified cordierite-forming material and a pore-forming material to prepare a moldable material; extruding said moldable material to form a honeycomb-shaped molding; and plugging the predetermined flow paths of said honeycomb-shaped molding to form said ceramic honeycomb filter;

said silica having a median diameter of 15-58 μm,
   said talc having a median diameter of 10-25 μm and a morphology index of 0.77-0.84,
   said kaolin having a median diameter of 1.5-7.5 μm and a cleavage index of 0.9-0.95, said cleavage index being a value expressed by $I_{(002)}/[I_{(200)}+I_{(020)}+I_{(002)}]$, wherein $I_{(200)}$, $I_{(020)}$ and $I_{(002)}$ are the peak intensities of (200), (020) and (002) planes measured by X-ray diffraction,
   said alumina source having a median diameter of 1.5-6 μm, and
   said pore-forming material comprising pore-forming material particles having a median diameter of 30-70 μm.

2. A method for producing a ceramic honeycomb filter comprising the steps of preparing a cordierite-forming material containing talc, silica, an alumina source and kaolin; classifying the cordierite-forming material by passing the cordierite-forming material through a sieve having opening diameters of 250 μm or less to form a classified cordierite-forming material; blending the classified cordierite-forming material and a pore-forming material to prepare a moldable material; extruding said moldable material to form a honeycomb-shaped molding; and plugging the predetermined flow paths of said honeycomb-shaped molding to form said ceramic honeycomb filter;

said silica having a median diameter of 15-58 μm,
   said talc having a median diameter of 10-25 μm and a morphology index of 0.77-0.84,
   said kaolin having a median diameter of 1.5-7.5 μm and a cleavage index of 0.9-0.95, said cleavage index being a value expressed by $I_{(002)}/[I_{(200)}+I_{(020)}+I_{(002)}]$, wherein $I_{(200)}$, $I_{(020)}$ and $I_{(002)}$ are the peak intensities of (200), (020) and (002) planes measured by X-ray diffraction,
   said alumina source having a median diameter of 1.5-6 μm, and
   said pore-forming material comprising pore-forming material particles having a median diameter of 30-70 μm,
   wherein in a curve showing the relation between a particle diameter of said pore-forming material particles and a cumulative volume of said pore-forming material particles, a particle diameter d90 of said pore-forming material particles at a cumulative volume corresponding to 90% of a total volume of the pore-forming material particles is 50-90 μm.

3. The method for producing a ceramic honeycomb filter according to claim 1, wherein said alumina source has a median diameter of 2-5 μm.

4. The method for producing a ceramic honeycomb filter according to claim 1, wherein said silica has a median diameter of 35-55 μm.

5. The method for producing a ceramic honeycomb filter according to claim 2, wherein said alumina source has a median diameter of 2-5 μm.

6. The method for producing a ceramic honeycomb filter according to claim 2, wherein said silica has a median diameter of 35-55 μm.

7. The method for producing a ceramic honeycomb filter according to claim 3, wherein said silica has a median diameter of 35-55 μm.

8. The method for producing a ceramic honeycomb filter according to claim 5, wherein said silica has a median diameter of 35-55 μm.

9. A method for producing a ceramic honeycomb filter comprising the steps of preparing a cordierite-forming material containing talc, silica, an alumina source and kaolin; classifying the cordierite-forming material by passing the cordierite-forming material through a sieve having opening diameters of 250 μm or less to form a classified cordierite-forming material; blending the classified cordierite-forming material and a pore-forming material to prepare a moldable material; extruding said moldable material to form a honeycomb-shaped molding; and plugging the predetermined flow paths of said honeycomb-shaped molding to form said ceramic honeycomb filter;

said silica having a median diameter of 15-58 μm,
   said talc having a median diameter of 10-25 μm and a morphology index of 0.77-0.84,
   said kaolin having a median diameter of 1.5-7.5 μm and a cleavage index of 0.9-0.95, said cleavage index being a value expressed by $I_{(002)}/[I_{(200)}+I_{(020)}+I_{(002)}]$, wherein $I_{(200)}$, $I_{(020)}$ and $I_{(002)}$ are the peak intensities of (200), (020) and (002) planes measured by-X ray diffraction, said alumina source having a median diameter of 1.5-6 μm, and said pore-forming material comprising pore-forming material particles having a median diameter of 30-70 μm, wherein in a curve having the relation between a particle diameter of said pore-forming material particles and a cumulative volume of said pore-forming material particles, a particle diameter d90 of said pore-forming material particles at a cumulative volume corresponding to 90% of a total volume of the pore-forming material particles is 60-80 μm.

10. The method for producing a ceramic honeycomb filter according to claim 9, wherein said alumina source has a median diameter of 2-5 μm.

11. The method for producing a ceramic honeycomb filter according to claim 9, wherein said silica has a median diameter of 35-55 μm.

12. The method for producing a ceramic honeycomb filter according to claim 10, wherein said silica has a median diameter of 35-55 μm.

* * * * *